Jan. 14, 1936.    A. DUBONNET    2,027,966
SUSPENSION DEVICE
Filed May 26, 1933    4 Sheets-Sheet 1
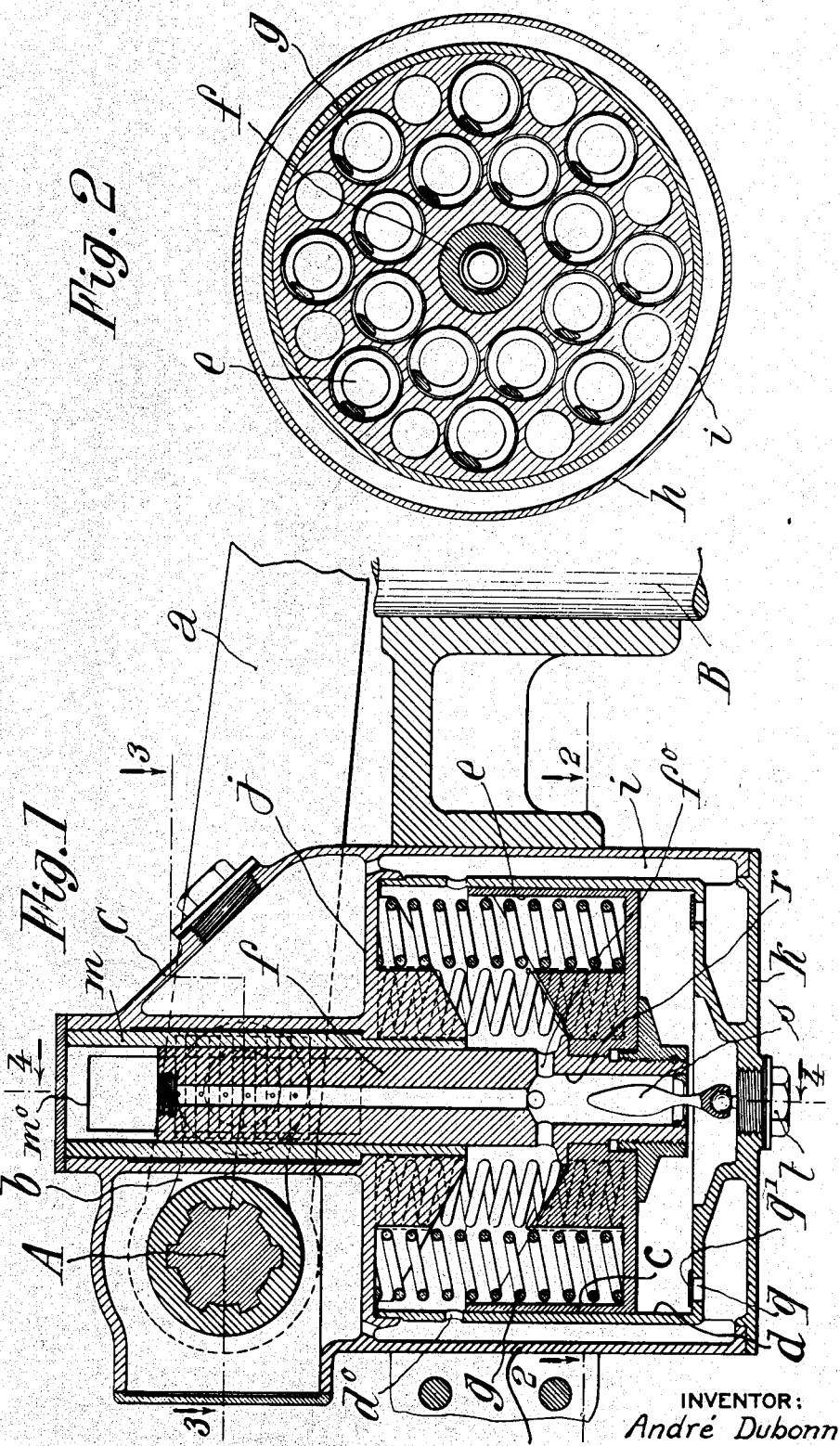
INVENTOR:
André Dubonnet
BY E. C. Sanborn
ATTORNEY Jan. 14, 1936.   A. DUBONNET   2,027,966
SUSPENSION DEVICE
Filed May 26, 1933   4 Sheets-Sheet 2
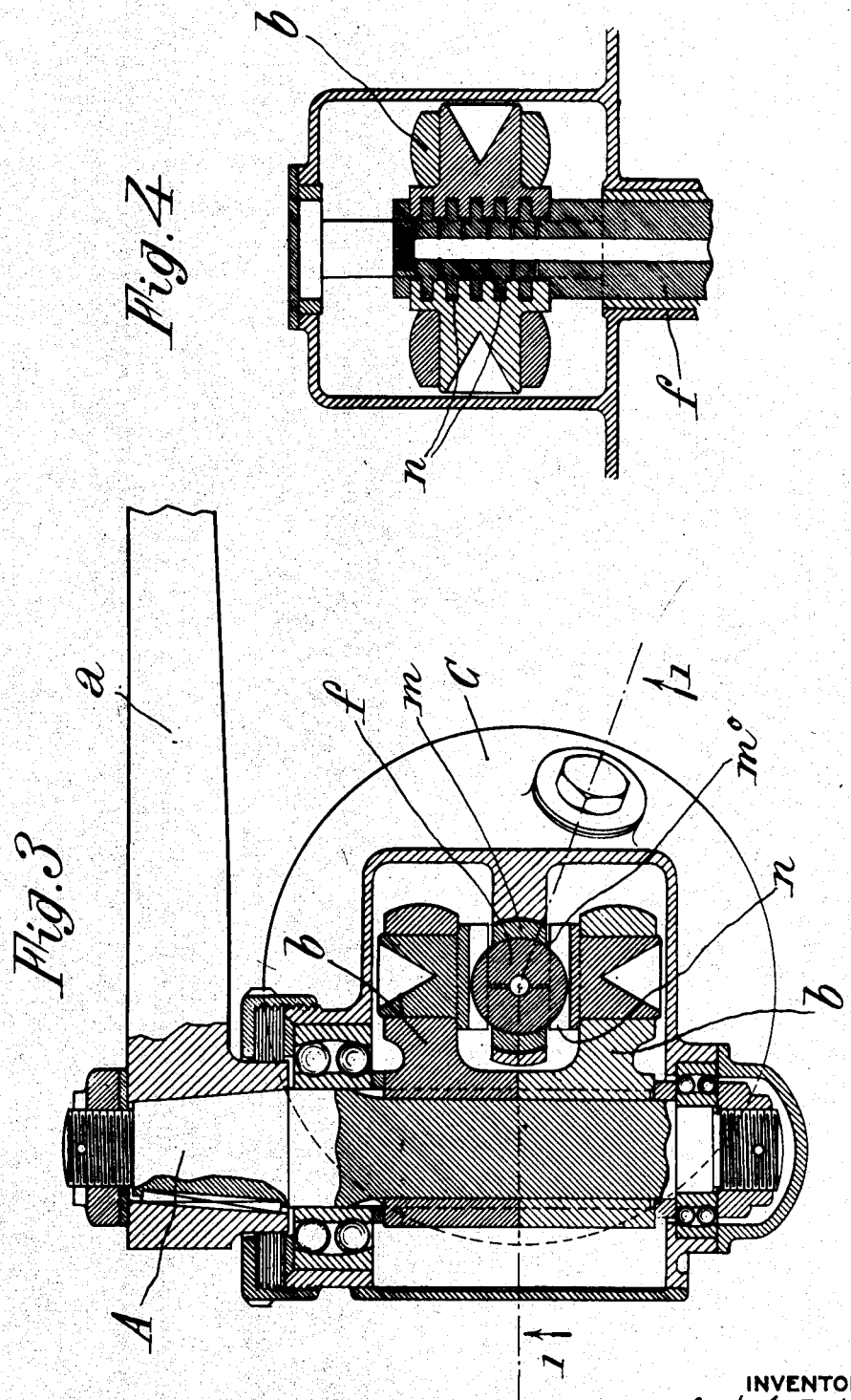
INVENTOR:
André Dubonnet
BY E. C. Sanborn
ATTORNEY Jan. 14, 1936.  A. DUBONNET  2,027,966
SUSPENSION DEVICE
Filed May 26, 1933  4 Sheets-Sheet 3
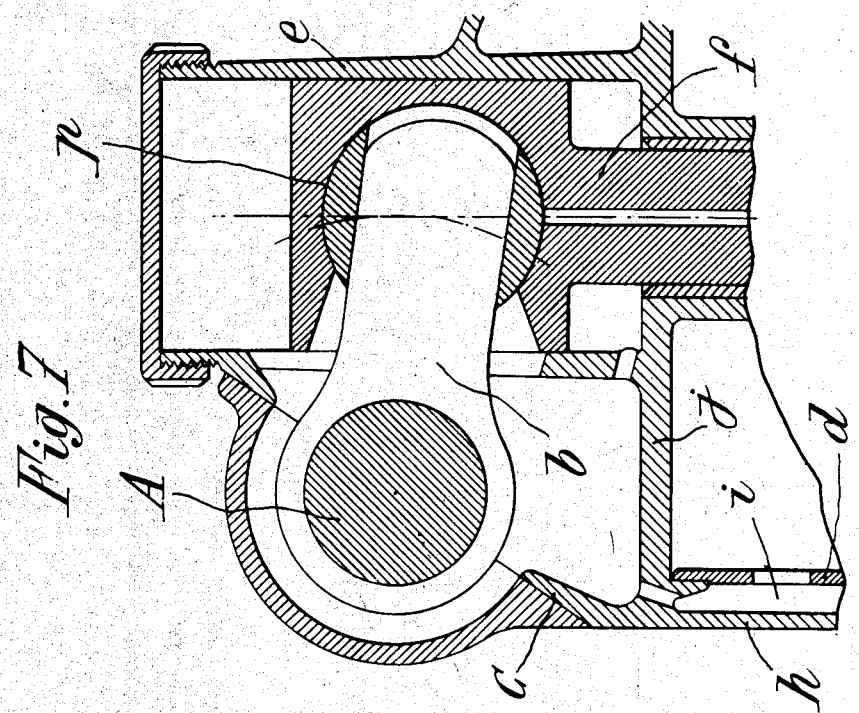
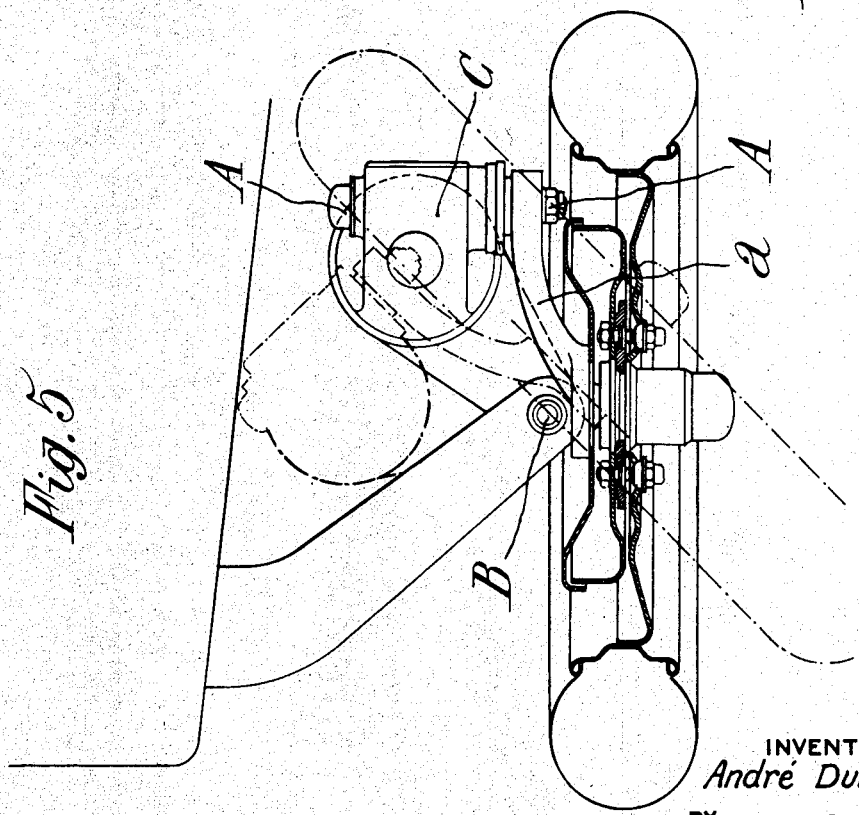
INVENTOR:
André Dubonnet
BY E. C. Sanborn
ATTORNEY Jan. 14, 1936.  A. DUBONNET  2,027,966

SUSPENSION DEVICE

Filed May 26, 1933  4 Sheets-Sheet 4

INVENTOR:
André Dubonnet
BY E. C. Sanborn
ATTORNEY

Patented Jan. 14, 1936

2,027,966

UNITED STATES PATENT OFFICE 2,027,966

SUSPENSION DEVICE

André Dubonnet, Neuilly, France

Application May 26, 1933, Serial No. 672,986

31 Claims. (Cl. 267—34)

My invention relates to suspension devices for vehicles, and especially motor vehicles, of the kind in which the axle journal of each wheel is carried by an arm pivoted to the suspended part of the vehicle about an axis substantially parallel to the axis of said axle. It is more especially intended for use with independent front or directing wheels.

The object of my invention is to provide improved devices of that kind that are more efficient in their working than those manufactured up to this time.

To this effect, according to my invention, the displacements of the arm that carries the wheel are opposed by the action of at least one elastic system comprising two plates, or equivalent members, one of which is carried by the suspended part of the vehicle so as to follow its displacements in a vertical direction, and the other one is connected with said arm through a suitable element, and a plurality of spiral springs each applied at their ends on said plates respectively. Advantageously one of said plates is rigidly fixed in a cylinder, and the other plate consists of a piston adapted to slide in said cylinder.

Preferably, according to my invention, the parts are so arranged that an effort tending to move the wheel upwardly exerts a traction on the element that carries the second mentioned plate (or piston) to said arm.

A third feature of my invention consists in causing the displacement of said two plates (cylinder and piston) to force a fluid such as oil through orifices of small section for shock absorbing purposes, in such manner that said fluid cannot come into contact with the spindle of the arm that carries the wheel.

These and other features of my invention will appear from the following description of preferred embodiments of my invention, with reference to the accompanying drawings, given merely by way of example, and in which:

Fig. 1 is a vertical sectional view on the line 1—1 of Fig. 3 of a device according to my invention;

Figs. 2, 3 and 4 are sectional views on the lines 2—2, 3—3 and 4—4 respectively of Fig. 1 showing a device according to my invention;

Fig. 5 is a diagrammatic plan view showing a part of an automobile vehicle frame provided with independent front wheels suspended by means of a device of the type of those shown in Figs. 1 to 4.

Figs. 6 and 7 are sectional views of two other embodiments of the device according to my invention.

Figure 6:
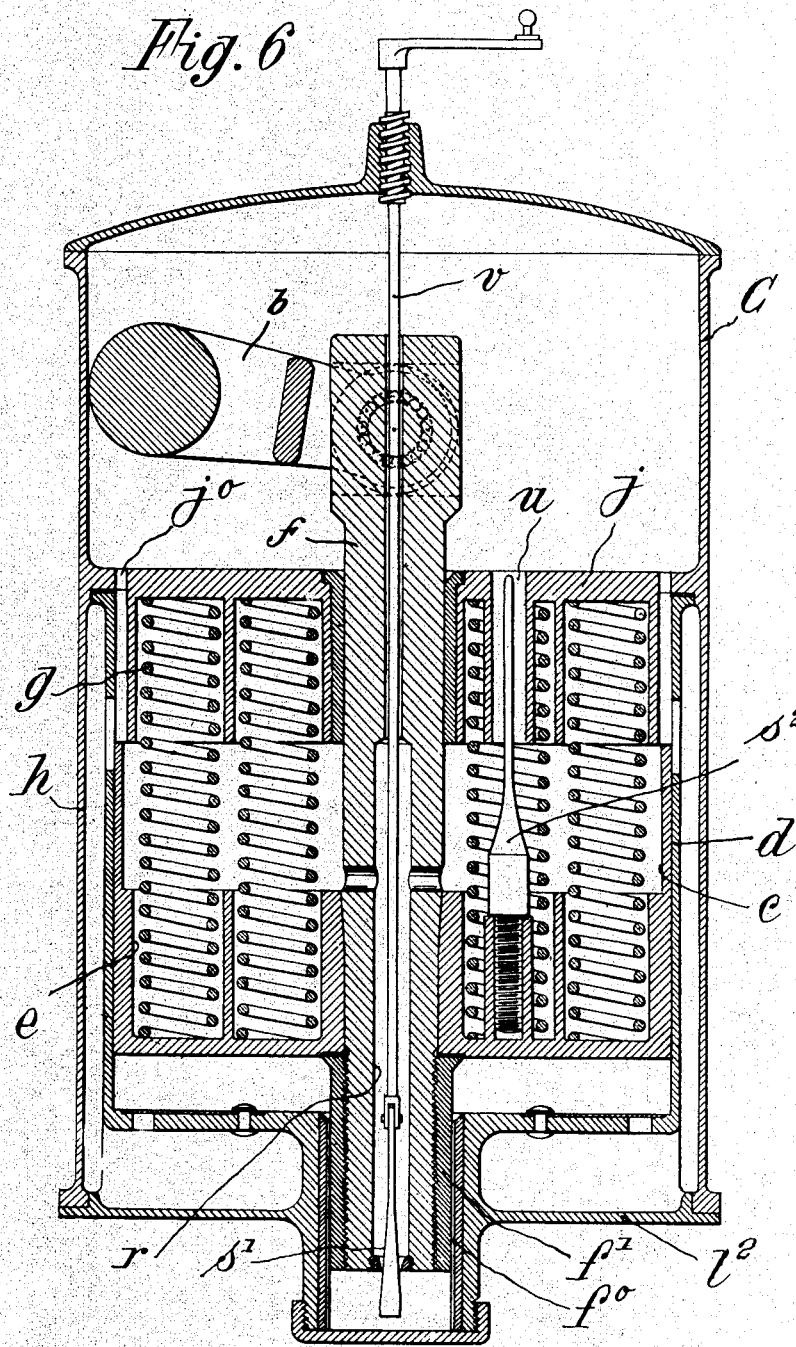

As shown in the drawings, the axle of each wheel is carried by an arm $a$ pivoted to the suspended part of the vehicle about an axis A substantially parallel to the axis of said axle, the movement of this arm being opposed by the action of elastic means according to a general arrangement of a known type.

According to my invention, these elastic means comprise a plurality of spiral springs all interposed between a member carried by the suspended part of the vehicle and an element suitably connected to said arm, or, as shown in the drawings, to an auxiliary lever $b$ pivoted about the same axis A as arm $a$, and angularly fixed to said arm.

Said springs may be given any suitable shape. They may be helically wound about a cylindrical, a conical or any other surface, and they may be disposed either in such manner that they concentrically surrounded one another, being then of different diameters, or in such manner that they are juxtaposed as shown in the drawings, then being either of the same diameter or of different diameters.

The movable element connected to lever $b$ and on which all of these springs are applied at one of their ends (the other ends of said springs resting upon a plate carried by the suspension part of the vehicle) may consist of another plate connected to lever $b$, the elastic system being then eventually surrounded by bellows.

Preferably, as shown in the drawings, this movable element consists of a piston $c$ adapted to slide in a cylinder $d$ adapted to contain the springs and which is integral with a casing C. This casing C may be either rigidly fixed to the suspended part of the vehicle, or pivoted about an axis B substantially vertical when the suspension device is to be applied to a front wheel, or more generally to a wheel capable of rotating about a vertical axis with respect to the vehicle frame.

This elastic system may be so arranged as to act on lever $b$ at a point thereof located either between axis A and the axis of the wheel axle, or on the other side of axis A with respect to said axle.

It should be well understood that instead of providing a single elastic system as shown in the drawings, I might make use of several systems of that kind acting either on the same point of lever $b$ (these systems being then for instance superposed), or on different points of said lever, eventually on either side of axis A, for instance symmetrically.

Preferably, according to another feature of my invention, which might eventually be applied separately, the elastic system is so arranged with respect to piston c or to any other element on which it acts, that an effort tending to move the wheel upwardly, exerts a traction on the element connecting said piston to lever b.

Supposing, for instance, piston c to be connected to lever b through a rod f, the arrangement just above stated can be obtained by disposing springs g inside chamber d on the same side as said rod. This permits, among other advantages, to reduce to a minimum the friction of the piston against the walls along which it slides, this friction being then much smaller than that which is developed when the device is so arranged that an effort tending to move the wheel upwardly has, on the contrary, for its effect to exert a thrust on rod f and piston c (although such an arrangement might be used according to my invention).

In combination with the suspension device that has just been described, I provide shock absorbing means which can be of various kinds.

I may either have recourse to shock absorbing means of the frictional or hydraulic type fitted independently of the suspension device proper, and the displacements of which are conjugated, through a suitable connection, with those of one of the organs of said suspension device.

I may also, preferably, when springs g act on a piston c, make use of the displacements of said piston in a chamber d for compelling a fluid, such as oil, filling at least a part of said chamber to pass through orifices of reduced section thus producing a shock absorbing braking action.

In the latter case, I advantageously make use of an arrangement (which might eventually be used separately as it is applicable to any suspension device of the type including an oscillating arm provided with hydraulic shock absorbing means) such that said shock absorbing fluid cannot reach the journal of the pivoting arm. In this way, the combined suspension and shock absorbing device is such that the oil level remains below said journal.

This last mentioned arrangement, one of the chief advantages of which consists in the fact that any possibility for said fluid escaping along spindle A is avoided, will be easily carried out, in the case of a piston c moving in a chamber d, by disposing this chamber below spindle A, as shown in the drawings, the displacement of said piston taking place for instance in the vertical direction.

I will now describe, by way of example, a suspension device comprising a plurality of springs coacting with a single piston according to the features that have been above stated.

Advantageously, piston c, and chamber d in which it is slidably fitted, are made of cylindrical shape, although they might also be of prismatic shape, especially in the case of a device including a pivoting casing C and intended for a directing wheel, in order to increase the facility of rotating the wheel about a vertical axis.

In any case, springs g are so arranged inside said cylinder d that, whatever be the position that is chosen for rod f through which the resultant force exerted by said springs is transmitted to lever b, said resultant force passes through the axis of said rod.

This adjustment can always be easily obtained owing to the fact that there is a great number of springs.

In a preferred embodiment of my invention, shown in Fig. 1, a cylindrical piston c is mounted within a cylinder d which itself is mounted, in an easily removable way, within a cylindrical box h of slightly larger diameter, thus leaving between its walls and those of said cylinder, a small annular space i which will be utilized for the flow of oil. The upper part of said box forms a stationary plate against which the springs are applied, while the movable plate consists of the plane face of piston c, the whole being closed at its lower part by a lid k, which, for instance, is rigidly fixed to cylinder d.

Advantageously, the bearing surfaces of these two plates are given a conical shape, and they are provided with hollows e in which the ends of the springs can be inserted.

The means for connecting rod f to lever b should be such as to allow certain relative sliding movements between said elements f and b.

In a first embodiment (Figs. 1 to 4) lever b has a forked end in which is journalled a spindle l made of two parts disposed on either side of the rod f. Said rod f is slidably fitted in a sleeve m provided with apertures $m^o$ opposite the two parts of said spindle l. Rod f on the one hand and said portions of spindle l on the other hand, are provided with grooves and projections n interlocking with one another, so that the whole permits an easy assembling and taking to pieces.

In another embodiment (Fig. 6), the end of said lever b is provided with at least one roller in a groove provided at the end of rod f.

In a third embodiment (Fig. 7) the end of said lever b is allowed to slide in a ball p swivelled in a spherical housing provided in the end of rod f.

The last of these embodiments makes it possible to obtain a variable flexibility owing to the fact that the reaction of the springs applied to lever b always passes through the axis of rod f, while the point of application of the force applied to the axle at the end of arm a, describes a circle.

Concerning now the shock absorbing means, they are preferably so arranged that the braking action of the oil may increase at the same time as the amplitude of the vertical oscillations of the wheel increases, and this for at least one of the two portions of the vertical displacement of said wheel that are on either side of its mean position, said braking action being however preferably kept constant for small amplitudes of oscillation.

According to the embodiment of Figs. 1 to 6, oil is allowed to circulate between annular space i and the two parts of cylinder d separated by piston c. Thus ports q provided with stopping means such as valves $q^1$ (consisting for instance of flexible blades) which open only when the piston moves upwardly, afford a communication between said annular space i and the lower part of said cylinder. On the other hand, ports $f^o$ provided in rod f and communicating with a longitudinal conduit r provided in said rod, afford a communication between said annular space i and the upper part of the cylinder since said longitudinal conduit is also connected with the lower part of cylinder d.

In order to permit of varying the braking action, an element or needle s of non-uniform cross section is caused to coact with the lower orifice of conduit r. This needle comprises for instance two conical portions opposed to each other and adapted to reduce the section of flow of the oil respectively when the piston comes close to either of its extreme positions, this section varying on the contrary but very little, for mean positions of the piston.

This needle will advantageously be carried by a removable plug $t$ (on which it may be swivelled) so that it is easy, by replacing said needle by another one, to vary the conditions under which the shock absorbing system is working.

Finally, the communication between the upper part of cylinder $d$ and space $i$ may also be obtained through ports $d^0$ provided in said cylinder, said ports being stopped as soon as piston $c$ has been moved upwardly a part of its stroke, so that oil is then allowed to flow only through ports $f^0$.

According to another embodiment shown in Fig. 6, the progressive variation of the shock absorbing effect is obtained by means of two needles, $s^1$, $s^2$ acting for the downward stroke and for the upward stroke of the piston respectively.

One of these needles $s^1$ coacts for instance with the lower orifice of conduit $r$, rod $f$ then comprising a prolonged part $f^1$ guided in sleeve $f^2$, which is provided with grooves $f^0$ for the passage of oil.

The other needle $s^2$ coacts with a conduit $u$ provided in partition $j$, oil being then allowed to flow above said partition, and to flow back thereunder through orifices $j^0$.

These needles may then be combined with adjusting means so as to permit of independently adjusting the shock absorbing efforts for the two extreme strokes of the wheel.

This means can be controlled from the outside as shown for needle $s^1$, for instance by means of a control element $v$ extending through rod $f$.

Finally, the whole of the suspension device that has just been described may of course be completed by braking elements on the wheels, and in this case, it will be advantageous, as shown in Fig. 9 to dispose the wheel axle ahead of spindle A in the direction of travel of the vehicle.

This arrangement permits of compensating for the effort applied to the frame under the effect of the braking torque transmitted to spindle A, by means of the effort applied to the frame under the effect of the negative acceleration at the time of the braking, these two efforts being, as it can easily be seen, opposed to each other.

The suspension device according to my invention as above described, has considerable advantages over existing suspension devices.

First, its mechanical construction is very simple and therefore comparatively inexpensive; secondly it is readily adjustable; and thirdly it occupies very little space.

The last mentioned advantage involves, in the case of a suspension device for a directing wheel (front wheel) the possibility of obtaining large angles of rotation of the wheel about a vertical axis, as shown in Fig. 5, even in the case of the elastic system being disposed on the rear of the pivoting axis B.

This is due to the fact that if, according to a particularly advantageous arrangement, the elastic system is so arranged that most of it is located between axis A and pivoting axis B, the space occupied by the whole of pivoting casing C can be reduced to a minimum.

This space may eventually be further reduced by giving chamber $d$ a suitable prismatic shape instead of a cylindrical shape.

While I have described what I deem to be practical and efficient embodiments of my invention, it should be well understood that I do not wish to be limited thereto as there might be changes made in the arrangement, disposition and form of the parts without departing from the principle of my invention as comprehended within the scope of the appended claims.

What I claim is:

1. In a vehicle including a suspended part, wheels, and axles for said wheels, a suspension device of the type described which comprises in combination, an element pivoted to said suspended part about a vertical axis, an arm carrying a wheel axle and pivoted to said element about an axis parallel to said axle, a plate rigidly fixed to said element, another plate parallel to the first one and vertically movable with respect thereto, a lever pivoted to said element about the same axis as said arm in fixed angular relation to said arm, a vertical rod rigidly fixed to said second plate and operatively connected with said lever so as to cause said second plate to move vertically with respect to said first plate responsive to angular displacements of said lever, and a plurality of springs each interposed between said two members so as to oppose angular displacements of said arm with respect to said element.

2. In a vehicle including a suspended part, wheels, and axles for said wheels, a suspension device of the type described which comprises in combination, a casing pivoted to said suspended part about a vertical axis, an arm carrying a wheel axle and pivoted to said casing about an axis parallel to said axle, a vertical cylinder in said casing, a plate in said cylinder rigidly fixed to said casing, a piston adapted to slide in said cylinder, a lever pivoted to said casing about the same axis as said arm in fixed angular relation to said arm, a vertical rod rigidly fixed to said piston and operatively connected with said lever so as to transmit the displacement of said lever to said piston, and a plurality of springs each interposed between said plate and the plane face of said piston so as to oppose angular displacements of said arm with respect to said casing.

3. A suspension device according to claim 2, in which the point at which said rod is connected to said lever is located on the other side of said plate from said piston.

4. In a vehicle including a suspended part, wheels, and axles for said wheels, a suspension device of the type described which comprises in combination, a casing pivoted to said suspended part about a vertical axis, an arm carrying a wheel axle and pivoted to said casing about an axis parallel to said axle, a vertical cylinder in said casing, a plate at the upper part of said cylinder rigidly fixed to said casing, a piston slidably mounted in said cylinder below said plate, a vertical rod rigidly fixed to said piston and extending above said plate, a lever pivoted to said casing about the same axis as said arm in fixed angular relation to said arm operatively connected to the upper end of said rod, so as to cause it to move vertically responsive to angular displacements of said lever, and a plurality of springs each interposed between said plate and the plane face of said piston so as to oppose angular displacements of said arm with respect to said casing.

5. A suspension device according to claim 2 in which the end of said lever is fork-shaped so that said rod may engage in said fork, further comprising a spindle parallel to said axis and made of two parts journalled in said forked end so as to be located on either side of said rod, the parts of said spindle and the corresponding part of the rod being provided with interlocking horizontal grooves and projections.

6. A suspension device according to claim 2 further comprising a roller journalled at the end of said lever, the corresponding end of said rod being provided with a horizontal groove adapted to receive said roller.

7. A suspension device according to claim 2, in which the upper end of said rod is provided with a spherical housing, further comprising a spherical element fitting in said housing and provided with an axial hole adapted to accommodate the end of said lever so that said lever may slide in said spherical element.

8. In a vehicle including a suspended part, wheels, and axles for said wheels, a suspension device of the type described which comprises in combination, a casing pivoted to said suspended part about a vertical axis, an arm carrying a wheel axle and pivoted to said casing about an axis parallel to said axle, a cylinder in said casing filled with liquid, a piston adapted to slide in said cylinder, a lever pivoted to said casing about the same axis as said arm in fixed angular relation thereto, a rod rigidly fixed to said piston and jointed with said lever, means provided in said cylinder for causing the liquid to flow through orifices of small cross section when the piston is moved so as to brake the displacements of said piston, the level of the liquid in said cylinder being located below said axis, and elastic means for opposing the angular displacements of said arm with respect to said casing.

9. In a vehicle including a suspended part, wheels, and axles for said wheels, a suspension device of the type described which comprises in combination, a casing pivoted to said suspended part about a vertical axis, an arm carrying a wheel axle and pivoted to said casing about an axis parallel to said axle, a vertical cylinder located in said casing so as to leave an annular space between the outer walls of said cylinder and said casing, a plate in said cylinder rigidly fixed to said casing, a piston adapted to slide in said cylinder, a lever pivoted to said casing about the same axis as said arm in fixed angular relation to said arm, a vertical rod rigidly fixed to said piston and operatively connected with said lever so as to transmit the displacements of said lever to said piston, a plurality of springs each interposed between said plate and the plane face of said piston so as to oppose angular displacements of said arm with respect to said casing, a liquid filling said cylinder and the annular space around it, the end face of said cylinder being provided with holes, and valves cooperating with said holes for allowing oil to flow therethrough from said annular space into said cylinder, said rod being hollow and provided with ports for connecting together the two sides of the piston.

10. In a vehicle including a suspended part, wheels and axles for said wheels, a suspension device of the type described, which comprises in combination, a casing pivoted to said suspended part about a vertical axis, an arm carrying a wheel axle and pivoted to said casing about an axis parallel to said axle, a vertical cylinder located in said casing so as to leave an annular space between the outer wall of said cylinder and said casing, a plate at the upper part of said cylinder rigidly fixed to said casing, a piston slidably mounted in said cylinder below said plate, a vertical rod rigidly fixed to said piston and extending above said plate, a lever pivoted to said casing about the same axis as said arm in fixed angular relation thereto operatively connected to the upper end of said rod, so as to cause it to move vertically responsive to angular displacements of said lever, a plurality of springs each interposed between said plate and the plane face of said piston so as to oppose angular displacements of said arm with respect to said casing, a liquid filling said cylinder and the annular space between it and the casing up to a level located below said lever, the lower end of said cylinder being provided with holes, and valves cooperating with said holes for allowing oil to flow up therethrough from said annular space into said cylinder, said rod being provided with a longitudinal conduit opening into its lower end throughout the piston and being provided with transversal ports so as to connect together the two sides of the piston.

11. A suspension device according to claim 10 further comprising means fixed to said casing and engaging in said conduit, for varying the section of flow through said conduit according to the position of the piston in the cylinder.

12. A suspension device according to claim 10 further comprising a plug fixed to the lower end of said cylinder directly below said conduit, and a needle of non-uniform cross section fixed to said plug so as to engage in said conduit, for varying the section of flow therethrough.

13. A suspension device according to claim 10 further comprising a needle fixed to the casing and adapted to cooperate with said conduit for varying the cross section of flow therethrough, said plate being provided with a conduit, extending therethrough for allowing oil to flow from said cylinder above said plate, and a needle of non-uniform cross section carried by said piston and adapted to engage in the last mentioned conduit for varying the section of flow therethrough.

14. A suspension device according to claim 10 further comprising a needle fixed to the casing and adapted to cooperate with said conduit for varying the cross section of flow therethrough, said plate being provided with a conduit, extending therethrough for allowing oil to flow from said cylinder above said plate, a needle of non-uniform cross section carried by said piston and adapted to engage in the last mentioned conduit for varying the section of flow therethrough, and means for adjusting the position of at least one of said needles with respect to the corresponding conduit.

15. A suspension device according to claim 2 in which the wheel axle is located ahead of the axis about which said arm is pivoted, and said cylinder is located on the same side of a vertical plane passing through the last mentioned axis as the wheel axle so that the greatest part of said casing is located between the last mentioned axis and the vertical axis about which the casing is pivoted to the suspended part of the vehicle.

16. A suspension device for vehicles comprising a support, a wheel carrying member having a wheel supporting spindle, pivot means for mounting said member oscillatably in said support about an axis spaced from that of said spindle, a movable element having a stem extending therefrom, means connecting said wheel carrying member with said stem, and resilient means for resisting movement of said element in response to movement of said wheel carrying member in a given direction, said resilient means comprising a plurality of springs exterior to each other and so distributed around said stem that the resultant of the forces which they exert passes through the axis of said stem.

17. A suspension device for vehicles comprising a support, a wheel carrying member having a wheel supporting spindle, pivot means for mounting said member oscillatably in said support about an axis spaced from that of said spindle, said support comprising a casing, an element movably mounted in said casing and having an upwardly extending stem, means connecting said wheel carrying member with said stem for causing said element to rise in response to upward movement of said member with respect to said casing, resilient means opposing upward movement of said element, said resilient means comprising a plurality of coil springs arranged externally of each other and distributed around said stem in such manner that the resultant of the forces which they exert passes through the axis of said stem, and fluid dampening means for opposing movement of said element and so arranged with respect to said pivot means that access of fluid to said pivot means is prevented and escape of fluid along said pivot means avoided.

18. A suspension device for vehicles comprising a support, a wheel carrying member having a wheel supporting spindle, pivot means for mounting said member oscillatably in said support about an axis spaced from that of said spindle, an element movably mounted with respect to said support and having a stem projecting therefrom, means connecting said member to said stem for imparting a pulling movement to said element in response to rising of said member with respect to said support, resilient means for resisting movement of said element, said resilient means comprising a plurality of coil springs arranged externally to each other and so distributed around said stem that the resultant of the forces which they exert passes through the axis of said stem.

19. A suspension device for vehicles comprising a support, a wheel carrying member having a wheel supporting spindle, pivot means for mounting said member oscillatably in said support about an axis spaced from that of said spindle, an element movably mounted on said support and having an upwardly extending stem, resilient means opposing movement of said element in one direction, fluid dampening means opposing movement of said element, and means connecting said wheel carrying member to said stem, said means comprising a lever connected to said wheel carrying member, said lever and stem having means providing grooves and projections for interlocking said lever with said stem.

20. A suspension device for vehicles comprising a support, a wheel carrying member having a wheel supporting spindle, pivot means for mounting said member oscillatably in said support about an axis spaced from that of said spindle, an element movably mounted with respect to said support, means connecting said wheel carrying member to said element, resilient means opposing movement of said element in a given direction, and fluid dampening means resisting movement of said element, said fluid dampening means comprising an orifice in said element for the passage of a shock absorbing fluid therethrough and an orifice restricting element, said orifice and said restricting element being so constructed and arranged that the section of the passage between said restricting element and said orifice varies in accordance with the position of the first mentioned element, and decreases when said first mentioned element departs from its mean position.

21. Apparatus as defined by claim 20, wherein said orifice restricting element is so arranged as to offer a progressively increasing shock absorbing action in two directions of displacement of the first mentioned element.

22. Apparatus as defined by claim 20, wherein said orifice restricting element comprises oppositely extending conical portions for offering a progressively increasing shock absorbing action in two directions of displacement of the first mentioned element.

23. A suspension device for vehicles comprising a support, a wheel carrying member having a wheel supporting spindle, pivot means for mounting said member oscillatably in said support about an axis spaced from that of said spindle, an element movably mounted with respect to said support, means for transmitting movement from said wheel carrying member to said element, resilient means resisting movement of said element in one direction, means providing a plurality of orifices for the passage of a shock absorbing fluid upon movement of said element in either of opposite directions, and means comprising a plurality of orifice restricting members cooperating with said orifices respectively for varying the section of the passage between each orifice and the respective restricting member in accordance with the position of said element.

24. Apparatus as defined by claim 20, wherein means is provided for manually changing the position of said orifice restricting element.

25. A suspension device for vehicles comprising a support, a wheel carrying member having a wheel supporting spindle, pivot means for mounting said member oscillatably in said support about an axis spaced from that of said spindle, a piston, means connecting said wheel carrying member to said piston, a casing comprising a plurality of compartments, said piston being mounted in one of said compartments, means providing for the passage of shock absorbing fluid from one of said compartments to the other during movement of said piston in one direction, said parts being so constructed and arranged that said passage is closed by the piston when the latter approaches an extreme position.

26. A suspension device for vehicles comprising a support, a wheel carrying member having a wheel supporting spindle, pivot means for mounting said member oscillatably in said support about an axis spaced from that of said spindle, said support comprising a casing having an extension, an interior casing secured to said first mentioned casing within said extension, a piston mounted in said interior casing, means connecting said wheel carrying member to said piston, resilient means opposing movement of said piston in one direction, and fluid dampening means opposing movement of said piston.

27. A suspension device for vehicles comprising a support, a wheel carrying member having a wheel supporting spindle, pivot means for mounting said member oscillatably in said support about an axis spaced from that of said spindle, spring suspension means positioned below said pivot means for resisting movement of said member in a given direction, fluid dampening means for resisting movement of said member and positioned below said pivot means, said fluid dampening means being so disposed with respect to said pivot means as to avoid escape of fluid along said pivot means, and means connecting said member with said spring suspensions means and said fluid dampening means.

28. A suspension device for vehicles comprising a support, a wheel carrying member having a wheel supporting spindle, pivot means for mounting said member oscillatably in said support about an axis spaced from that of said spindle, said support comprising a casing having a partition dividing the same into upper and lower compartments, said pivot means being mounted in said upper compartment, spring suspension means opposing movement of said element in a given direction, fluid dampening means in said lower compartment and comprising a piston, said fluid dampening means being so constructed and arranged that said piston forces fluid from one side to the other thereof during movement of said piston in one direction and forces fluid to return to the first mentioned side thereof during movement of said piston in the opposite direction, and means connecting said wheel carrying member to said resilient means and said fluid dampening means.

29. A suspension device for vehicles comprising a support, a wheel carrying member having a wheel supporting spindle, pivot means for mounting said member oscillatably in said support about an axis spaced from that of said spindle, fluid dampening means comprising a piston element positioned below said pivot means and fluid passage means below said pivot means, spring suspension means below said pivot means for resisting movement of said wheel carrying member in a given direction, and means connecting said member with said spring suspension means and said fluid dampening means, said fluid dampening means being so constructed and arranged that said piston forces fluid from one side thereof through said passage means during movement of said piston in one direction and forces fluid to return to the first mentioned side of said piston during movement of the latter in the opposite direction.

30. A suspension device for vehicles comprising a support, a wheel carrying member having a wheel supporting spindle, pivot means for mounting said member oscillatably in said support about an axis spaced from that of said spindle, said support comprising a casing having a partition dividing the same into upper and lower compartments, said pivot means being mounted in said upper compartment, resilient suspension means in said lower compartment opposing movement of said member in a given direction, fluid dampening means in said lower compartment and comprising a piston, said fluid dampening means being so constructed and arranged that said piston forces fluid from one side to the other thereof during movement of said piston in one direction and forces fluid to return to the first mentioned side thereof during movement of said piston in the opposite direction, and means connecting said wheel carrying member to said resilient means and said fluid dampening means.

31. A suspension device for vehicles comprising a support, a wheel carrying member having a wheel supporting spindle, pivot means for mounting said member oscillatably in said support about an axis spaced from that of said spindle, said support comprising a casing, spring suspension means in said casing below said pivot means for resisting movement of said wheel carrying member in a given direction, an element in said casing movable with said wheel carrying member against the resistance of said spring suspension means, and fluid dampening means in said casing below said pivot means for resisting the return movement of said element to its normal position.

ANDRÉ DUBONNET.